(12) United States Patent
Ponthieu

(10) Patent No.: US 6,908,521 B2
(45) Date of Patent: Jun. 21, 2005

(54) METHOD OF MANUFACTURING A DASHBOARD PORTION FITTED WITH AN AIR BAG

(75) Inventor: Didier Ponthieu, Meru (FR)

(73) Assignee: Faurecia Interieur Industrie, Nanterre (FR)

(*) Notice: Subject to any disclaimer, the term of this patent is extended or adjusted under 35 U.S.C. 154(b) by 59 days.

(21) Appl. No.: 10/414,288

(22) Filed: Apr. 16, 2003

(65) Prior Publication Data

US 2004/0026009 A1 Feb. 12, 2004

(30) Foreign Application Priority Data

Apr. 18, 2002 (FR) .............................................. 02 04901

(51) Int. Cl.⁷ ................................................. B29C 65/06
(52) U.S. Cl. ........................................ 156/73.5; 156/82
(58) Field of Search ............................... 156/73.5, 73.6, 156/82, 308.2, 308.4, 580; 264/68

(56) References Cited

U.S. PATENT DOCUMENTS

| | | | | |
|---|---|---|---|---|
| 5,564,731 A | * | 10/1996 | Gallagher et al. | ....... 280/728.3 |
| 5,685,930 A | * | 11/1997 | Gallagher et al. | ......... 156/73.1 |
| 5,902,428 A | * | 5/1999 | Gallagher et al. | ......... 156/73.1 |
| 6,318,752 B1 | | 11/2001 | Warnecke et al. | ....... 280/728.3 |
| 6,337,461 B1 | | 1/2002 | Yasuda et al. | ......... 219/121.62 |

FOREIGN PATENT DOCUMENTS

| | | |
|---|---|---|
| EP | 0 967 066 | 12/1999 |
| FR | 2799700 | 4/2001 |

OTHER PUBLICATIONS (Abstract only), Patent Abstracts of Japan, 2001122071, May 8, 2001, Calsonic Kansei Corp.

* cited by examiner

Primary Examiner—James Sells
(74) Attorney, Agent, or Firm—Young & Thompson

(57) ABSTRACT

A dashboard is made that presents a cover for an air bag protection system, the cover being invisible from the outside and being defined by an inside line of weakness in the wall of the dashboard, the line of weakness defining an opening for the air bag. A layer of hard plastics material is injection molded; the line of weakness is cut locally inside the wall; the outside of the plastics layer is covered with a decorative covering; a tab with a hinge for hinging the cover is fastened to the cover; the reinforcing frame is fastened to the plastics layer, and prior to welding, it is ensured that a vibratory discontinuity exists between the frame and the tab so that during welding some of the vibration generated is absorbed away from the line of weakness; and the tab is fastened to the reinforcing frame.

11 Claims, 2 Drawing Sheets

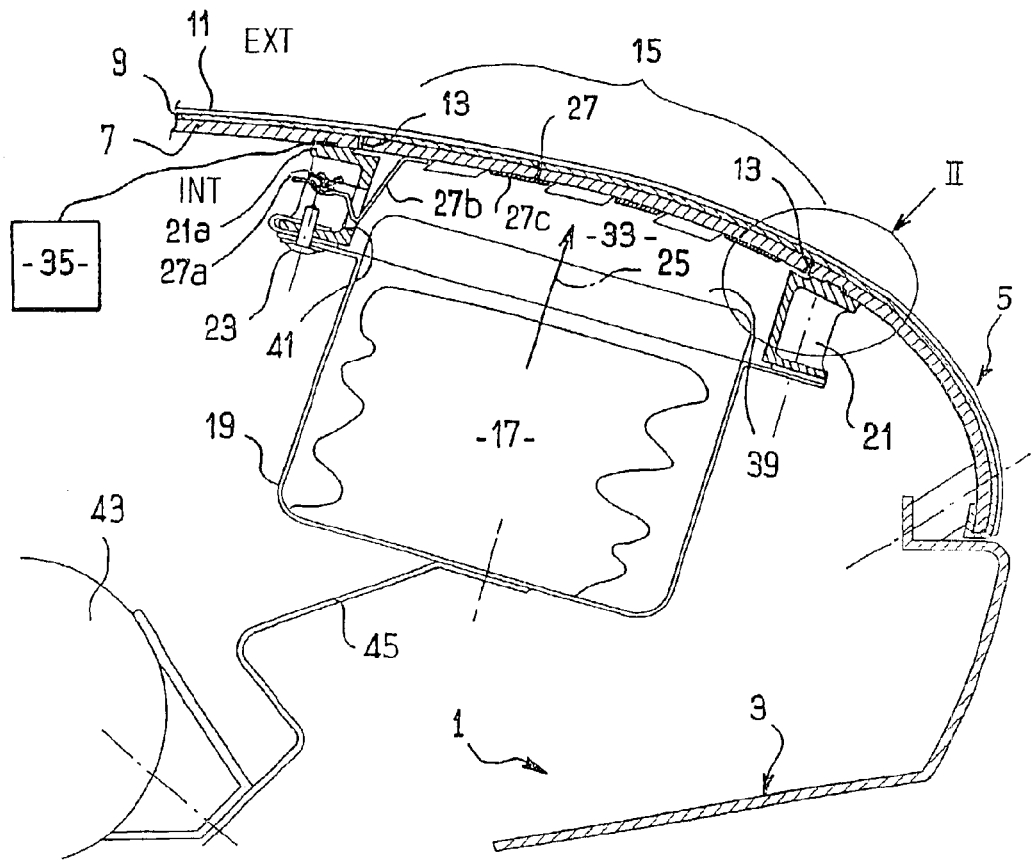
FIG_1
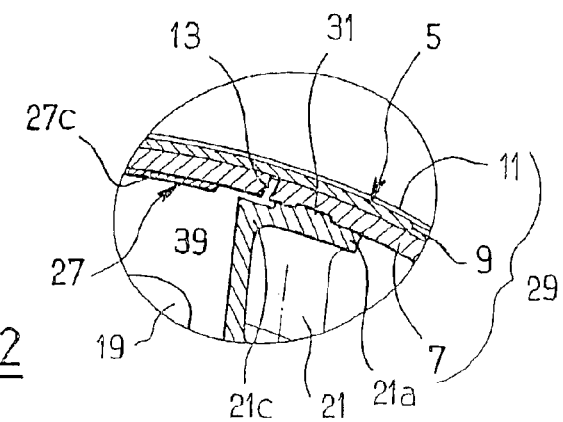
FIG_2

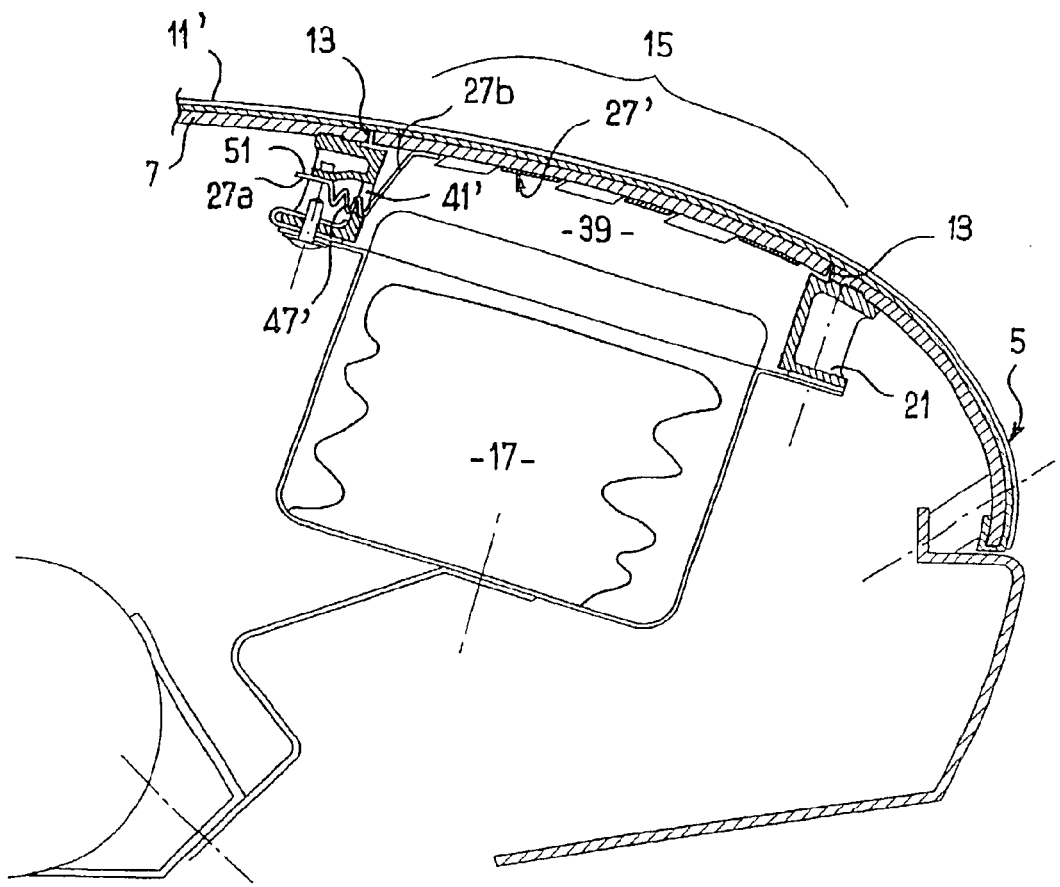
FIG_3
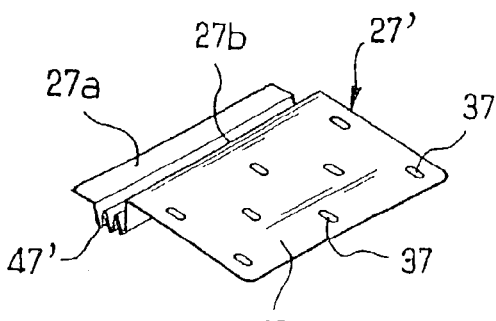
FIG_4

METHOD OF MANUFACTURING A DASHBOARD PORTION FITTED WITH AN AIR BAG

The invention relates to a dashboard for a motor vehicle.

FIELD OF THE INVENTION

More particularly, the invention relates to a method of manufacturing a dashboard presenting an outside, an inside, and a wall including a cover for an air bag protection system placed behind the dashboard, the cover being invisible from the outside and being defined at its margin by a line of weakness in the wall of the dashboard, said line of weakness being visible from the inside and defining an opening for the air bag(s). This method comprises the steps of:

a) injection molding a layer of hard plastics material;

b) locally making a line of weakness in the layer of hard plastics material, advantageously by cutting after molding;

c) covering the layer of hard plastics material on the outside with a decorative covering; and d) providing a tab having a hinge for hinging the cover relative to a reinforcing frame of hard plastics material adapted to be fastened to the inside of the dashboard and defining an ejection channel for the air bag(s), the tab being naturally sensitive to vibration generated by a device for welding plastics material by vibration and thus being naturally liable to transmit said vibration, said tab being adapted to be fastened to said layer of hard plastics material and to the reinforcing frame in the vicinity of the cover in areas that are situated on the inside of the dashboard.

BACKGROUND OF THE INVENTION

The problem which arises relates to the drawbacks that can result from vibration welding the reinforcing frame to the dashboard.

This connection takes place in the immediate vicinity of the line of weakness, and as a result the dashboard runs the risk of being damaged by the vibration.

In particular, the line of weakness in the wall runs the risk of becoming visible from the outside of the dashboard in spite of the decorative covering.

More generally, it can be considered that the step of vibration welding the reinforcing frame to the hard plastics layer of the dashboard is critical for the integrity, the strength, and the appearance of the dashboard at the location of or in the immediate vicinity of its cover that is designed to be invisible from the outside.

OBJECTS AND SUMMARY OF THE INVENTION

In order to provide a solution to this problem, a feature of the invention provides for:

e) fastening the tab to the cover;

f) in order to fasten the reinforcing frame to the dashboard, vibration welding it to the layer of hard plastics material in the immediate vicinity of the line of weakness, and prior to performing said welding, ensuring that a vibratory discontinuity exists between the reinforcing frame and the tab so that while the reinforcing frame is being welded, at least some of the vibration generated by the welding is absorbed away from the line of weakness defining the cover; and g) immediately before step f) or after said step, fastening the tab to the reinforcing frame.

For more ergonomic manufacture associated in particular with standardizing such manufacture, with mass production, and with reducing manufacturing costs, it is advisable for step e) of fastening the tab to the cover to be performed between steps d) and f), and before step g). Steps b) and c) can be performed in the opposite order.

In order to further limit the stresses applied to the line of weakness during manufacture, it is advisable for step e) to include hot air riveting.

In which case, provision is made a priori for the layer of hard plastics material notably constituting the inside portion of the cover to be made of a thermoplastic material (typically EPDM polypropylene) and for the tab to be made of metal with through passages for such riveting.

It is also advisable, for a strong assembly and for proper behavior of the dashboard while the air bag is escaping, to make an integral tab by stamping sheet metal, the tab integrating the area for fastening to the frame, the hinge, and the area for fastening to the layer of hard plastics material.

Advantageously, said tab is in the form of a plate that is angled at the location of the hinge.

To achieve in as appropriate a manner as possible the "vibratory discontinuity" established during step f) between the reinforcing frame and the tab, as described above, two implementations are more particularly envisaged.

In a first implementation:

during step d), a tab is provided which presents a vibration damping area between the hinge and the area for fastening the tab to the frame; and the tab is fastened to the reinforcing frame between steps e) and f).

Advantageously, the vibration damping area is permanently integrated in the tab, which then presents a redundant section at the location of said area.

In a second implementation:

during step f), provision is made for absorbing vibration in air, by postponing the fastening of the tab to the reinforcing frame until immediately after this step; and it is thus not until the subsequent step g) that said tab is fastened to the reinforcing frame.

It should also be observed that, at present, certain vehicle dashboards need to present an external decorative covering in the form of a skin that presents the appearance of being lined internally with a layer of foam.

A feature of the invention thus provides, during step c), for the hard plastics layer to be covered by a covering that includes a layer of foam lined by a fine skin (or film) for decorative purposes.

Such a solution provides an agreeable external appearance with a "flexible" feel. However, such a covering with a layer of foam increases the risks of making the area of weakness of the cover visible, thus making it all the more necessary to provide a solution to the problem already raised by using vibration welding to fasten the reinforcing frame.

In this respect, the problem of a defect that is visible on the outside of the dashboard is particularly critical since the skin provided for appearance purposes is a plastics skin and since it is put into place together with the intermediate layer of foam over the hard plastics layer by thermally covering.

BRIEF DESCRIPTION OF THE DRAWINGS

There follows a more detailed description of the invention with reference to the accompanying drawings, in which:

FIG. 1 is a diagrammatic section view of a first embodiment of the invention;

FIG. 2 is an enlarged view showing a detail II of FIGS. 1 and 3;

FIG. 3 shows an alternative embodiment in the same section view as FIG. 1; and

FIG. 4 shows an embodiment of the tab about which the cover is hinged, when the tab is constituted by a metal plate including a "dead length" for damping vibration (shown at a smaller scale than in FIG. 3).

MORE DETAILED DESCRIPTION

It is stated immediately that the thicknesses of the layers making up the wall of the dashboard portion shown in FIGS. 1, 2, and 3 are not shown in proportion to one another. Typically, the layers are of thickness that decreases from the inside towards the outside.

In FIG. 1, there can be seen a local section of a dashboard 1 (or instrument panel) of a motor vehicle.

Typically the dashboard is made (at least for the most part) of out of thermoplastic material.

In its bottom portion, this dashboard comprises a dashboard body 3, and in its top portion it comprises a dashboard top 5.

It is the top 5 that is of interest here.

The top 5 comprises three layers going from the interior (INT) towards the exterior (EXT): a fairly thick first layer of hard plastics material 7 (e.g. of EPDM polypropylene), covered in a second layer of expanded foam 9, itself covered in a fine decorative outer layer 11.

The outer layer 11 is typically made of flexible plastics material that is referred to as a "skin".

In the first layer 7, typically referred to as an "insert", there is provided a local line of weakness 13.

This weakening consists in a slot cut preferably through the entire thickness of the layer 7 from the inside. The slot forms an outline which is completely or partially looped.

In the embodiment of FIG. 1, the outline comprises four sides substantially in the form of a rectangle.

Thus, within the boundary marked by this line of weakness, there is defined a cover 15 for a system for protecting the front occupant(s) of the vehicle by means of one or more air bags.

Reference 17 designates one such air bag, in its deflated state.

The air bag 17 is placed inside a box 19 fastened to a reinforcing frame 21 by fastener means such as screws, one of which is referenced 23.

The air bag 17 and its box 19 are placed inside the dashboard, as is the reinforcing frame 21 which may be in the form of a four-sided frame of channel section, as shown in FIG. 1.

In the illustration, the fastenings between the box 19 and the frame 21 are provided in one of the flanges of the channel section, while the other flange 21a is used for fastening the frame 21 to the dashboard top 5, and more particularly to its plastics inner layer 7.

Although the continuous or discontinues slot constituting the line of weakness 13 is visible from inside the dashboard (ignoring the presence of the reinforcing frame 21), it is required that the line of weakness should not be visible from the outside of the dashboard top, given that it does not go through the decorative outer layer 11, nor even through the outermost portion of the intermediate layer of plastics foam 9.

As will be understood, the line of weakness 13 defines an opening for the air bag 19 in the event of the air bag being propelled out from its box under driving pressure (not shown) in the direction of arrow 25, thus breaking the line of weakness over at least the major portion of its length, and moving out from the dashboard top 5 towards the occupant of the vehicle situated facing this region of the dashboard.

For controlled exit of the air bag and in order to avoid losing the cover 15 (also referred to as a "hatch"), the cover is hinged to the reinforcing frame 21.

This hinge function, together with an additional function of reinforcing the cover 15, is provided by a tab 27 fastened at 27a to the frame 21 and presenting a hinge portion 27b.

This tab 27 is constituted by a stamped metal sheet. It thus extends inside the dashboard under the dashboard top 5 and also presents a portion 27c which lines the inside of the portion of the layer 7 that constitutes the inner layer of the cover 15.

The portion 27c of the tab 27 preferably extends over at least the major fraction of the inside surface of the cover 15, substantially all the way to the outer margin thereof, as can be seen in FIG. 2 where the slot 13 is shown in more detail.

It is considered that the set of layers 7, 9, 11 constitutes for the dashboard and more precisely for the dashboard top 5, a wall given overall reference 29 in FIG. 2.

As can likewise be seen more clearly in FIG. 2, the flange 21a of the reinforcing frame 21 is fastened by vibration welding to the inner hard plastics layer 7 in a location 31.

It should be observed that the purpose of the frame 21 is not only to reinforce the structure of the dashboard, given the presence of the air bag, but also to serve as a channel through which the air bag is ejected in order to ensure that it travels in the direction 25 to the opening 33 that is created by the cover 15 pivoting about the hinge 27b when the air bag explodes.

As mentioned above, an important problem solved by the invention relates to the damage which the dashboard top 5 might suffer, at least locally, while the reinforcing frame 21 is being vibration welded to the layer 7.

In order to provide a solution to this problem, the invention proposes making the above-described assembly shown in FIG. 1 as follows.

Firstly, the layer of hard plastics material 7 is injected under pressure into an injection mold. Thereafter, at least this layer is cut locally from the inside in order to constitute the line of weakness 13. For this purpose, it is possible to make use of laser cutting.

Thereafter, the outside of the layer 7 as locally cut in this manner is covered in the surface layers 9 and 11 so that the slot 13 is not visible to the eye from the outside of the dashboard top 5, the outer layer 11 possibly being constituted in particular by an optionally grained fine layer of plastics material.

In order to perform this step of covering the layer 7, it is technically appropriate in some cases to make use of hot redundant sectioning which consists in lining the layer 7 with a layer of expanded plastics foam 9 itself covered in an outer decorative skin 11. In practice, this contributes to the risk of making the line of weakness 13 visible.

Assuming that the tab 27 were made of a strip or a plate of thermoplastic material, as in U.S. Pat. No. 6,318,752, this risk would nevertheless typically be considered as being acceptable, given that the way in which the frame 21 is fastened to the wall 29 would not have made the risk of revealing the slot 13 from the outside of the dashboard any worse, since under those circumstances there would not be any problems of vibration being transmitted by the strip or plate to the environment of the line of weakness 13.

However, in the context of the invention, provision is made for the tab 29 to be a tab which is naturally sensitive to the vibration generated during welding and thus liable to transmit damage to the location or the vicinity of the line of weakness 13.

In particular, the tab 27 can consist in a metal plate shaped with one or more bends, as shown in section in FIG. 1, the thickness of this plate compared with its other dimensions being such that it is effective in transmitting the vibration generated by the vibration welding device represented diagrammatically at 35 in FIG. 1.

As mentioned above, the solution provided by the invention to this problem is to ensure vibratory discontinuity between the frame 21 and the tab 27.

For this purpose, in a first solution, provision is made to fasten the portion 27c of the "naturally vibratory" tab 27 to the layer 7 in the vicinity of the cover 15, but not to fasten its opposite portion 27a, so that when vibration welding is applied to the frame 21, no vibration is transmitted to the tab 27, with air serving to absorb the vibrations.

It is only after vibration welding has been performed that the portion 27a is fastened to the frame 21.

It should be observed that another solution would be to fasten the tab at 27c to the frame 21 without fastening the area 27c, said area being bonded to the dashboard top 5 only after the step of vibration welding the frame 21. However, this solution is less practical industrially and it is not recommended herein.

For the connection between the tab 27 and the layer 7, it is preferably implemented by hot air riveting if the portion 27c presents, as shown in FIG. 4, passages 27 allowing molten plastics material to flow through the facing surface of said tab, thus guaranteeing effective fastening. This limits the risks of making the line of weakness 13 visible.

It should also be observed that the tab 27 is fastened to the frame 21 outside the ejection channel 39 defined by the frame 21 and in communication with the opening 33.

This outer fastening can be implemented on a rib of the reinforcing frame, and at the base of its hinge 27b, the tab may pass through an opening 41 provided in the web of the frame 21, on one of the sides thereof.

In FIG. 2, it can also be seen that the frame 21 is advantageously placed in such a manner that, once fastened, it projects a little into the inside of the area defined by the cover 15 so that under such circumstances the weakening slots 13 are protected by a corner of the frame (see 21c in FIG. 2).

On reaching this stage of fabrication, the box 19 containing the deflated air bag 17 and its propulsion system is fastened to the frame 21, in particular at 23.

An additional fastening to a cross-beam forming part of the structure of the vehicle that reinforces the dashboard 1 as a whole, can also be provided via a plate 45 connecting the crossbeam 43 to the box 19.

The difference between the solution shown in FIG. 3 and that shown in FIG. 1 lies in the way in which vibratory discontinuity is established between the reinforcing frame and the tab, in particular so as to avoid making the cover 15 visible.

In this case, a vibration damping area is made between the hinge of the reinforcing tab and the area where said tab is fastened to the frame 21.

In FIG. 3, parts that are identical with the embodiment shown in FIG. 1 are given the same references.

Thus, although the reinforcing and hinge tab is now given overall reference 27', it still comprises a plate-shaped portion 27c as shown in FIG. 4 for lining the inside of the cover 15 and hinged at the hinge 27b formed by one of the bends in said tab 27', which hinge has the special feature of including a redundant section 47' which is preferably situated between the hinge area 27b and the area 27a for fastening to the frame 21.

In this case, the tab 27' may be fastened to the cover and to the frame prior to welding the frame to the dashboard.

In particular, the redundant section 47' can be constituted by a corrugated or zigzag area forming a kind of extra length suitable for breaking vibratory waves transmitted by the welding device 35 when fastening the frame to the layer 7.

Advantageously, this redundant section 47' is situated outside the ejection channel 39, i.e. beyond the passage 41' through which the tab 27' passes in order to be fastened to the rib 51 of the frame.

This avoids occupying space in the passage reserved for exit of the air bag 17 and avoids interfering with the hinge area 27b.

The dashboard top 5 still comprises, in addition to the rigid insert 7 of plastics material, a fine decorative outer layer which may be made of cloth, as referenced 11' in FIG. 3, even if the thermally covering solution is preferred for manufacturing reasons, for safety reasons concerning opening of the cover in the embodiments described above, and for reliability in ensuring that the presence of a cover for the air bag remains invisible behind the decorative layer.

What is claimed is:

1. A method of manufacturing a portion of a dashboard presenting an outside, an inside, and a wall including a cover for an air bag protection system placed behind the dashboard, as seen from the outside, the cover being invisible from the outside and being defined at its margin by a line of weakness in the wall of the dashboard, said line of weakness being visible from the inside and defining an opening for the air bag(s), the method comprising the following steps:

a) injection molding a layer of hard plastics material;
 b) locally making a line of weakness in the layer of hard plastics material, from the inside;
 c) covering the layer of hard plastics material on the outside with a decorative covering;
 d) providing a tab having a hinge for hinging the cover relative to a reinforcing frame of hard plastics material adapted to be fastened to the inside of the dashboard and defining an ejection channel for the air bag(s), the tab being naturally sensitive to vibration generated by a device for welding plastics material by vibration and thus being naturally liable to transmit said vibration, said tab being adapted to be fastened to said layer of hard plastics material and to the reinforcing frame in the vicinity of the cover in areas that are situated on the inside of the dashboard;
 e) fastening the tab to the cover;
 f) in order to fasten the reinforcing frame to the dashboard, vibration welding it to the layer of hard plastics material in the immediate vicinity of the line of weakness, and prior to performing said welding, ensuring that a vibratory discontinuity exists between the reinforcing frame and the tab so that while the reinforcing frame is being welded, at least some of the vibration generated by the welding is absorbed away from the line of weakness defining the cover; and
 g) immediately before step f) or after said step, fastening the tab to the reinforcing frame.

2. A method according to claim 1, wherein step e) takes place between steps d) and f) and before step g).

3. A method according to claim 1, wherein step e) of fastening the tab to the cover comprises hot air riveting.

4. A method according to claim 1, wherein, during step d), an integral tab of sheet metal is made by stamping to include the area for fastening to the frame, the hinge, and the area for fastening to the layer of hard plastics material.

5. A method according to claim 4, wherein step e) of fastening the tab to the cover comprises hot air riveting, and wherein the tab is in the form of a plate that is bent at the location of the hinge and that is pierced by passages in register with the cover.

6. A method according to claim 1, wherein:

during step d), a tab is provided which presents a vibration damping area between the hinge and the area for fastening the tab to the frame; and between steps e) and f), the tab is fastened to the reinforcing frame.

7. A method according to claim 6, wherein the vibration damping area is integrated in the tab, which tab presents a redundant section at said area.

8. A method according to claim 1, wherein:

during step f), said vibration is absorbed in air, by postponing the step of fastening the tab to the reinforcing frame until after said step f); and during step g), subsequent to step f), said tab is fastened to the reinforcing frame.

9. A method according to claim 1, wherein, during step c), the layer of hard material is covered with a covering comprising a layer of foam lined with a skin for appearance purposes.

10. A method according to claim 9, wherein, during step c), the layer of hard material is thermally covered, the skin for appearance purposes constituting a layer of plastics material.

11. A method according to claim 7, wherein the redundant section of the tab is situated outside the ejection channel reserved for the air bag(s).

* * * * *